United States Patent
Muraoka et al.

(10) Patent No.: US 8,053,712 B2
(45) Date of Patent: Nov. 8, 2011

(54) USE OF A PHOTOELECTRIC CONVERTED SIGNAL TO INSPECT AN OBJECTIVE LENS DRIVING DEVICE

(75) Inventors: Yasuhiro Muraoka, Gunma (JP);
Masaharu Sakazume, Kanagawa (JP);
Yoshimaru Nakane, Gunma (JP);
Hiroshi Yoshida, Gunma (JP); Shinya Tsukada, Tochigi (JP)

(73) Assignee: Sanyo Electric Co., Ltd., Osaka (JP)

( * ) Notice: Subject to any disclaimer, the term of this patent is extended or adjusted under 35 U.S.C. 154(b) by 325 days.

(21) Appl. No.: 12/390,228

(22) Filed: Feb. 20, 2009

(65) Prior Publication Data
US 2009/0206239 A1    Aug. 20, 2009

(30) Foreign Application Priority Data

Feb. 20, 2008   (JP) .................... 2008-039330
Nov. 7, 2008   (JP) .................... 2008-286576

(51) Int. Cl.
*G02B 7/04*    (2006.01)
*G01B 11/14*   (2006.01)
(52) U.S. Cl. ..................... 250/201.6; 356/624
(58) Field of Classification Search ............... 250/201.6; 369/44.32; 356/624
See application file for complete search history.

(56) References Cited

U.S. PATENT DOCUMENTS 3,643,015 A * 2/1972 Davidovits et al. ............. 348/79
7,254,097 B2 * 8/2007 Nogami et al. ............ 369/44.11

FOREIGN PATENT DOCUMENTS

JP    2003-016668    1/2003

* cited by examiner

*Primary Examiner* — Thanh X Luu
(74) *Attorney, Agent, or Firm* — Fish & Richardson P.C.

(57) ABSTRACT

An inspecting method for an object lens driving device including a base, an objective lens, a holder for holding the objective lens on the base, and a drive mechanism for driving the holder so as to move the objective lens in the focus direction, the method comprising the steps of: emitting a laser beam through the objective lens; allowing the laser beam emitted through the objective lens to pass through an aperture having a predetermined diameter; applying to the drive mechanism a drive voltage for moving the holder between a first position closest to a surface of the base and a second position farther than the first position from the surface of the base; performing photoelectric conversion of the laser beam having passed through the aperture; and inspecting the objective lens driving device based on a signal obtained by the photoelectric conversion.

8 Claims, 11 Drawing Sheets

USE OF A PHOTOELECTRIC CONVERTED SIGNAL TO INSPECT AN OBJECTIVE LENS DRIVING DEVICE

CROSS-REFERENCE TO RELATED APPLICATIONS

This application claims the benefit of priority to Japanese Patent Application Nos. 2008-039330 and 2008-286576, filed Feb. 20, 2008 and Nov. 7, 2008, respectively, of which full contents are incorporated herein by reference.

BACKGROUND OF THE INVENTION

1. Field of the Invention

The present invention relates to an inspection method and an inspecting apparatus for an objective lens driving device.

2. Description of the Related Art

An objective lens driving device is known which drives an objective lens for applying a laser beam for recording or reproducing information to/from an optical disc (see e.g., Japanese Patent Application Laid-Open Publication No. 2003-16668 (Pages 1 to 3, FIGS. 11 to 12)). In the objective lens driving device, focusing control is performed for correcting focusing displacement of the laser beam on a disc surface by moving the objective lens in the direction perpendicular to the disc surface. The objective lens driving device is used for an optical pickup apparatus for recording or reproducing information to/from the optical disc, for example.

A configuration of an objective lens driving device 1 will then be described with reference to FIG. 11.

A base 10 is a metal plate-shaped base including a magnet 21 and a magnet 22 each in a substantially rectangular parallelepiped shape and a yoke 11 and a yoke 12 each in a substantially rectangular flat plate shape having the magnet 21 and the magnet 22 respectively fixed thereto. Specifically, a pair of the yokes 11 and 12 in the substantially rectangular flat plate shape is so formed on the base 10 as to be opposed to each other in the tangential direction of FIG. 11 (tangential direction of a track of the optical disc (not shown) mounted on a turn table (not shown)) and a predetermined housing portion 90 is so formed as to have an opening for providing a main body portion 30 (an actuator main body portion) of an actuator ACT in between the yokes 11 and 12. The "actuator" refers to a driving device that converts energy into translational movement or rotational movement, for example.

The magnet 21 and the magnet 22 are rectangular-parallelepiped-shaped monopole permanent magnets having polarities different from each other. A back surface 21b of the magnet 21 is fixed to the yoke 11 and a back surface 22b of the magnet 22 is fixed to the yoke 21, such that front surfaces of the pair of the magnets 21 and 22 are opposed to each other across the housing portion 90 on the base 10. For example, a magnetic gap is formed in and around/near the housing portion 90 on the base 10 positioned between the opposed surfaces of the magnets 21 and 22. Bottom surfaces 21a and 22a positioned in the focus direction (direction perpendicular to a surface of the optical disc (not shown) mounted on the turn table (not shown)) of the magnet 21 and the magnet 22 are bonded to top surfaces 10b and 10c of the base 10 with an adhesive. Reference numerals 61 and 62 shown in FIG. 11 denote bonding areas between the magnets 21 and 22, and the base 10.

The actuator ACT includes: for example, a lens holder 31 (holder) that holds an objective lens OBL; substantially linear suspension wires 40 (wires) that elastically support the actuator main body portion 30 including a holder 31, etc. provided with the objective lens OBL, etc., so that the actuator main body portion 30 can move; a support plate 50 to which one ends 42 of both ends 41 and 42 of the substantially linear suspension wires 40 is fixed; locking members 32 that lock the other ends 41 of the both ends 41 and 42 of a plurality of the substantially linear suspension wires 40 on each of two opposed side surfaces 31a and 31b positioned in the radial direction (direction perpendicular to the track of the disc surface) of the holder 31 (e.g., two wires for each of the side surfaces 31a and 31b); tracking coils 33 that drive the actuator main body portion 30 positioned mainly substantially in the radial direction; and a focus coil 34 that drives the actuator main body portion 30 mainly substantially in the focus direction. A space 90a for moving the main body portion 30 of the actuator ACT in the focus direction exists between a rear surface 30a of the main body portion 30 of the actuator ACT and a one-step lowered surface 10a positioned substantially in the center of the base 10 and at a distance in the focus direction from the rear surface 30a of the main body portion 30 of the actuator ACT.

The suspension wires 40 are metal wires elastically supporting the main body portion 30 of the actuator ACT via the locking members 32 and having a function of lead wires for passing electric currents through the tracking coils 33, the focusing coils 34, etc. Specifically, each of the suspension wires 40 is locked at the one end 41 to the locking member 32 with solder flux and is fixed at the other end 42 to the support plate 50 with solder agent, damper material, etc., so as to extend parallel to the base 10. The damper material functions to absorb vibrations such as abnormal vibrations when the main body portion 30 of the actuator ACT is driven/moved.

The support plate 50 is a plate to which the other ends 42 of the suspension wires 10 are fixed. The support plate 50 and the base 10 are fixed with each other via a metal case (not shown), for example.

Figure 11:
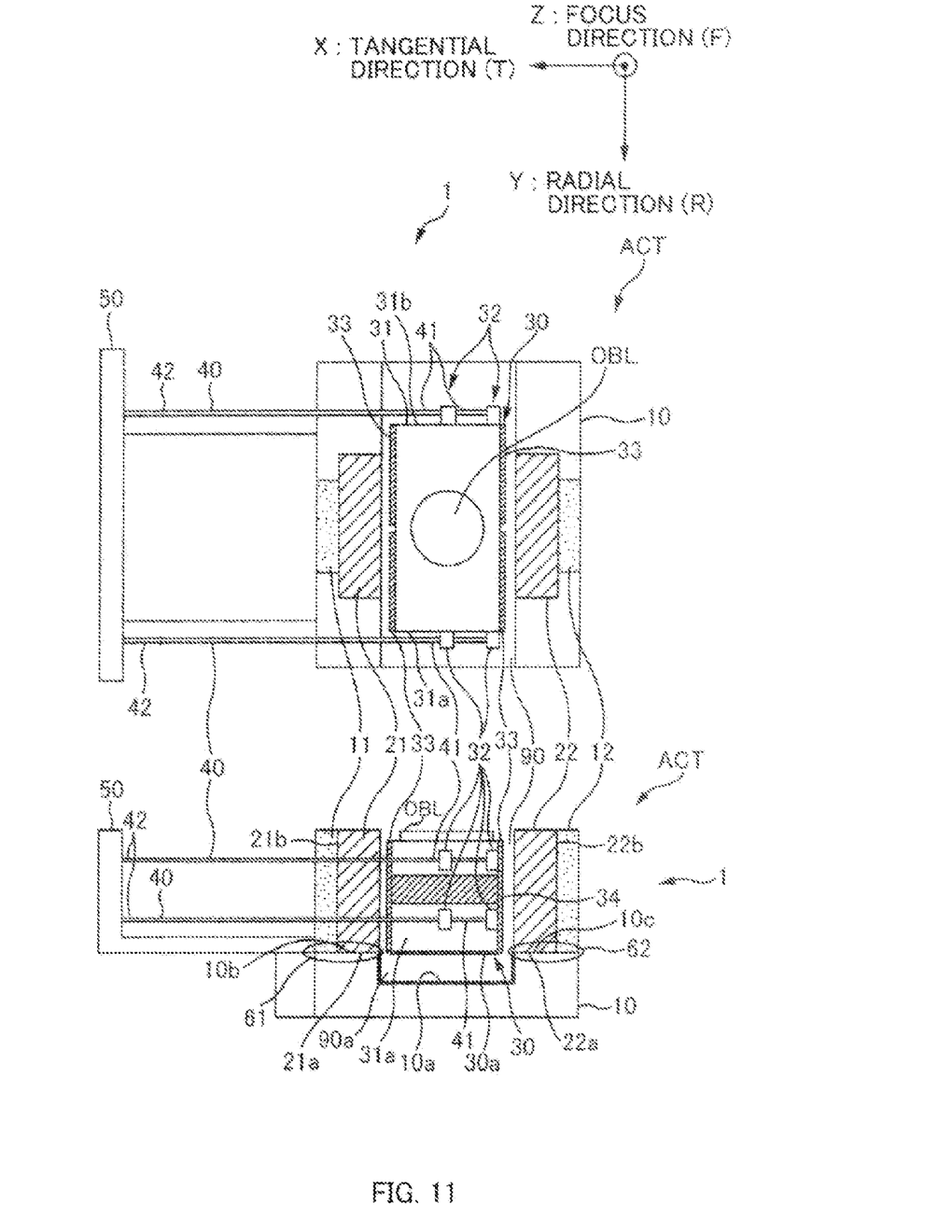
FIG. 11 is a diagram of a cop view and a cross-sectional view of an objective lens driving device.

As above, constituent elements other than the base 10 and the holder 31 in FIG. 11 make up a drive mechanism for driving the holder 31 so as to move the objective lens OBL in the focus direction and the tracking direction.

The bonding areas 61 and 62 are areas for bonding the bottom surfaces 21a and 22a of the magnets 21 and 22 to the top surfaces 10b and 10c of the base 10 with an adhesive agent, however, the adhesive agent may flow out or seep out to the one-step lowered surface 10a substantially in the center of the base 10 opposed to the rear surface 30a of the main body portion 30 of the actuator ACT provided with the holder 31, for example. The adhesive agent may not be applied to the bonding areas 61 and 62 as prescribed and may adhere to the one-step lowered surface 10a substantially in the center of the base 10 opposed to the rear surface 30a of the main body portion 30 of the actuator ACT.

The locking member 32 of the main body portion 30 of the actuator ACT locks the one end 41 of the suspension wire 40 by soldering using solder flux, for example, however, the solder flux may adhere to the one-step lowered surface 10a substantially in the center of the base 10 opposed to the bottom surface 30a of the main body portion 30 of the actuator ACT when performing the above soldering operation.

The other end 42 of the suspension wire 40 is fixed to the support plate 50 using the soldering agent or a damper material, for example, however, the damper material may adhere to the one-step lowered surface 10a substantially in the center of the base 10 opposed to the rear surface 30a of the main body portion 30 of the actuator ACT when performing the above fixing operation.

It is assumed that an adhesive foreign substance such as the adhesive agent, soldering flux, or damper material adheres to the one-step lowered surface 10a substantially in the center of the base 10 opposed to the rear surface 30a of the main body portion 30 of the actuator ACT, as above. In this case, when the main body portion 30 of the actuator ACT is moved for the focusing control such that the rear surface 30a of the main body portion 30 of the actuator ACT is moved closer to the one-step lowered surface 10a substantially in the center of the base 10, the rear surface 30a of the main body portion 30 of the actuator ACT adheres to the one-step lowered surface 10a substantially in the center of the base 10 due to the adhesive foreign substance as above.

Under such a situation, when attempting to move the rear surface 30a of the main body portion 30 of the actuator ACT away from the one-step lowered surface 10a substantially in the center of the base 10, there is a problem that the main body portion 30 of the actuator ACT may not smoothly be moved (the controlled response may not be in a linear form) due to the adhesive foreign substance, and thus, the focusing control may not be performed as intended.

This is not limited to the above adhesive foreign substance, but also in a case where a foreign substance such as dust enters between the rear surface 30a of the main body portion 30 of the actuator ACT and the one-step lowered surface 10a substantially in the center of the base 10, there is the problem that the main body portion 30 of the actuator ACT is not smoothly moved.

SUMMARY OF THE INVENTION

An inspecting method for an object lens driving device according to an aspect of the present invention, which includes a base, an objective lens, a holder for holding the objective lens on the base, and a drive mechanism for driving the holder so as to move the objective lens in the focus direction, comprises the steps of: emitting a laser beam through the objective lens; allowing the laser beam emitted through the objective Lens to pass through an aperture having a predetermined diameter; applying to the drive mechanism a drive voltage for moving the holder between a first position closest to a surface of the base and a second position farther than the first position from the surface of the base; performing photoelectric conversion of the laser beam having passed through the aperture; and inspecting the objective lens driving device based on a signal obtained by the photoelectric conversion.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

==Configuration of Inspecting Apparatus==

Figure 1:
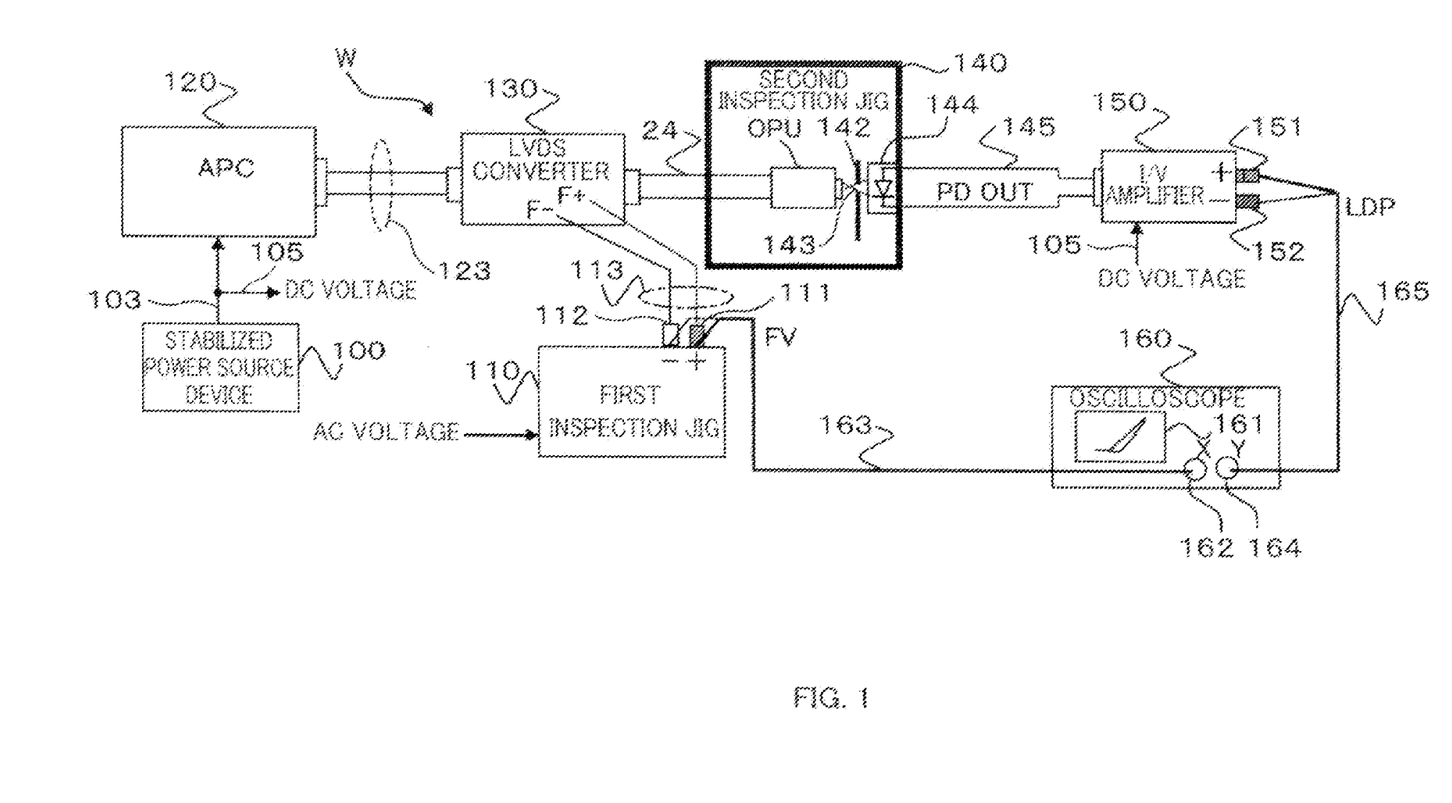
FIG. 1 is a diagram of a configuration of an inspecting apparatus for an objective lens driving device according to an embodiment of the present invention.

FIG. 1 depicts an overall configuration of an inspecting apparatus W that inspects an operation condition when performing the focusing control of an objective lens driving device according to an embodiment of the present invention. For convenience of description, it is assumed that an object to be inspected by the inspecting apparatus W is an objective lens driving device 1 shown in FIG. 11.

The inspecting apparatus W of the objective lens driving device 1 is mainly made up of a stabilized power source device 100, a first inspection jig 110 (drive voltage generator), APC (automatic power control) 120, LVDS (low voltage differential signaling) converter 130; a second inspection jig 140, an I/V amplifier (current/voltage conversion circuit), and an oscilloscope 160 (waveform displaying device).

The stabilized power source device 100 is a power source device that applies DC voltages to the APC 120 and the I/V amplifier 150. The stabilized power source device 100 is connected to the APC 120 through a cable 103 and connected to the I/V amplifier 150 through a cable 105.

The first inspection jig 110 is a master jig in which a setting is made for inspecting a movement of the main body portion 30 of the actuator ACT in the focus direction. Specifically, the first inspection jig 110 generates a drive voltage to be applied to the focus coil 34 of the actuator ACT making up an optical pickup apparatus OPU to generate a focus coil drive voltage FV. The focus coil drive voltage FV is applied to the focus coil 34 of the actuator ACT making up the optical pickup apparatus OPU from a positive terminal 111 and a negative terminal 112 of the first inspection jig 110 by a twisted pair cable 113 via the LVDS converter 130 in FIG. 1.

The APC 120 performs control for driving a laser light source (not shown) included in the optical pickup apparatus CPU to emit light with constant electric power. Specifically, the APC 120 receives the DC voltage applied from the stabilized power source device 100, supplies electric power to the laser light source of the optical pickup apparatus OPU through the LVDS converter 130, and supplies a control signal to the laser light source, etc., of the optical pickup apparatus OPU. The control signal output from the APC 120 is transmitted to the LVDS converter 130 through a cable 123. The laser light source (light source) includes a light emitting element such as a laser diode (LD).

The LVDS converter 130 receives the electric power and the control signal transmitted through the cable 123 from the APC, performs LVDS conversion of the control signal to supply the electric power and the control signal to the laser light source, and applies the focus coil drive voltage FV transmitted from the first inspection jig 110 through the twisted pair cable 113 to the focus coil 34 of the actuator ACT. APC 120 and the first inspection jig 110 act as a signal source and the LVDS converter 130 acts as a relay device and an LVDS transceiver for the second inspection jig 140. The LVDS converter 130 is connected to the optical pickup apparatus OPU included in the second inspection jig 140 through a flexible cable 24 (cable), for example.

The second inspection jig 140 is, for example, a slave jig for performing an operation for inspecting the movement of the actuator main body portion 30 making up the actuator ACT in the focus direction. The second inspection jig 140 mainly includes an aperture 142 having a pinhole 143, and an optical sensor 144. The optical pickup apparatus OPU is included in the second inspection jig 140. The aperture 142, the optical sensor 144, and the optical pickup apparatus OPU are disposed parallel to a horizontal plane (X-Y plane).

Figure 10:
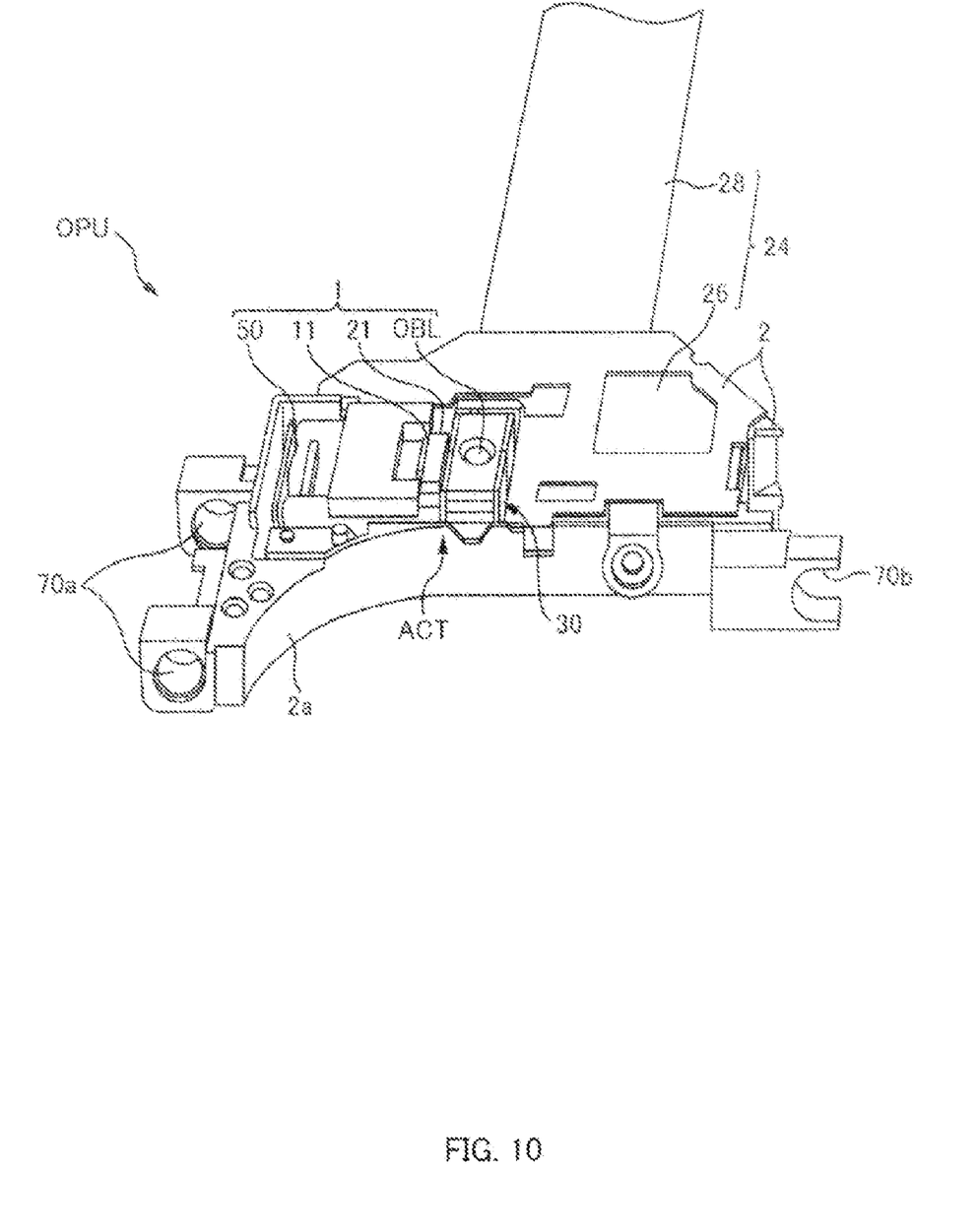
FIG. 10 is a perspective view of an optical pickup apparatus.

An exterior configuration of the optical pickup apparatus OPU is shown in FIG. 10. FIG. 10 depicts a partial internal configuration of the optical pickup apparatus OPU with some parts removed. The optical pickup apparatus OPU is made such that an optical system (not shown), etc., such as the objective lens driving device 1 and the light source is housed in a metal and/or resin case 2, and includes: the optical system that applies light emitted from the light source to the objective lens OBL via a reflection mirror, etc.; a circuit board 50 (board) of the objective lens driving device 1; and a flexible circuit boards 24 (cables), etc., such as a flexible printed circuit board 26 connected electrically with the suspension wires 40, etc., and a flexible cable 28 connected electrically with the flexible printed circuit board 26, so as to achieve downsizing by various efforts. In FIG. 10, there are illustrated the yoke 11, the magnet 21, the objective lens OBL, the actuator ACT, the actuator main body portion 30, and the support plate 50 of FIG. 11, for example.

The aperture 142 is an object, for example, a plate, having a pinhole 143 (hole) with a predetermined diameter, for example, for convenience sake. An "aperture" means, for example, a hole or an opening, and here, is defined as such a thing or an object having such a thing, for convenience sake. When a laser beam from a predetermined laser light source is applied to the aperture 142 through the objective lens OBL of the optical pickup apparatus OPU, a condensed light flux emitted through the objective lens OBL is limited by the aperture 142. A portion of the condensed light flux passes through the pinhole 143. The optical sensor 144 is a sensor that receives a portion of the condensed light flux having passed through the pinhole 143 of the aperture 142 (pinhole passing light) to be photoelectrically converted into a light-reception current PDOUT according to an amount of light received as above. The optical sensor 144 is connected to the I/V amplifier 150 through a cable 145.

The I/V amplifier 150 is, for example, a current/voltage conversion circuit that converts the light-reception current PDOUT of the optical sensor 144 into a voltage to generate a sensor output voltage LDP that is further amplified. The sensor output voltage LDP is output from a positive terminal 151 and a negative terminal 152 of the I/V amplifier 150 of FIG. 1. For example, the optical sensor 144 and the I/V amplifier 150 may be an example of a sensor according to an embodiment of the preset invention depending on the specification of the inspecting apparatus W of the objective lens driving device 1.

The oscilloscope 160 is configured as a signal inspecting apparatus that inspects the objective lens driving device 1 based on the signal obtained by photoelectric conversion with the optical sensor 144, for example. Specifically, the oscilloscope 160 is a waveform displaying device that displays waveforms of the focus coil drive voltage FV output from the positive terminal 111 and the negative terminal 112 of the first inspection jig 110 and the sensor output voltage LDP output from the positive terminal 151 and the negative terminal 152 of the I/V amplifier 150 on a two-dimensional graph. The oscilloscope 160 includes a display screen 161, an X-axis channel 162 (CH-X), and a Y-axis channel 164 (CH-Y). The channel 162 is connected to the positive terminal 111 and the negative terminal 112 of the first inspection jig 110 through a probe 163. The channel 164 is connected to the positive terminal 151 and the negative terminal 152 of the I/V amplifier 150 through a probe 165.

When a normal mode is set in the oscilloscope 160, a waveform representing change over time of each of the focus coil drive voltage FV and the sensor output voltage LDP is displayed on the display screen 161 (the vertical axis (Y-axis) represents voltage and the horizontal axis (X-axis) represents time.) For example, when an X-Y mode is set in the oscilloscope 160, Lissajous waveforms of the focus coil drive voltage FV and the sensor output voltage LDP are displayed on the display screen 161 (the vertical axis (Y-axis) represents sensor output voltage LDP and the horizontal axis (X-axis) represents focus coil drive voltage FV.)

The cables 24, 103, 105, 113, 123, and 145 and the probes 163 and 165 make up electric cables, for example. Each of the cables 24, 103, 105, 113, 123, and 145 may be provided with, for example, a relay board (not shown) for the detachable/attachable and conductive connection of the cables 24, 103, 105, 113, 123, and 145.

The inspecting apparatus W of the objective lens driving device 1 includes the stabilized power source device 100, the APC 120, the LVDS converter 130, the I/V amplifier 150, the oscilloscope 160, and actuator stuck jump countermeasure jigs such as the first inspection jig 110 and the second inspection jig 140.

==Configuration of Second Inspection Jig==

Figure 2:
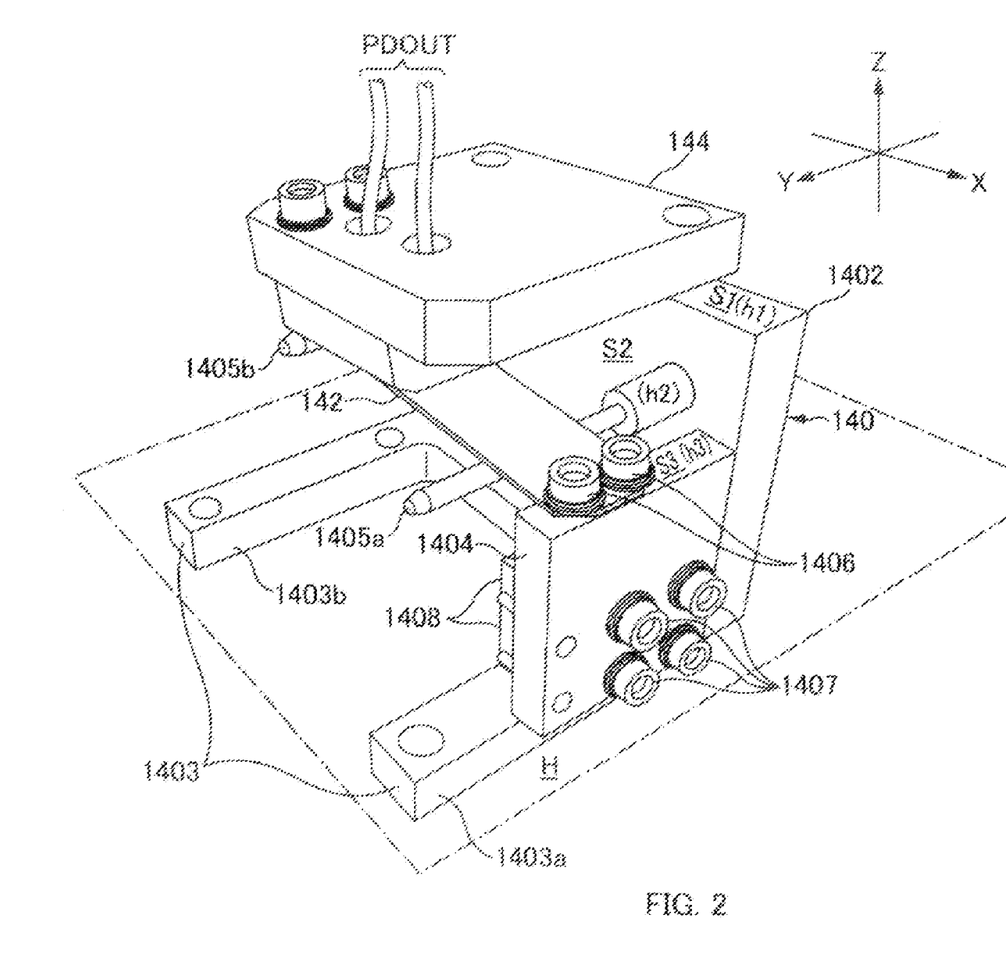
FIG. 2 is a perspective view of a second inspection jig with an optical pickup apparatus removed therefrom according to an embodiment of the present invention.
Figure 3:
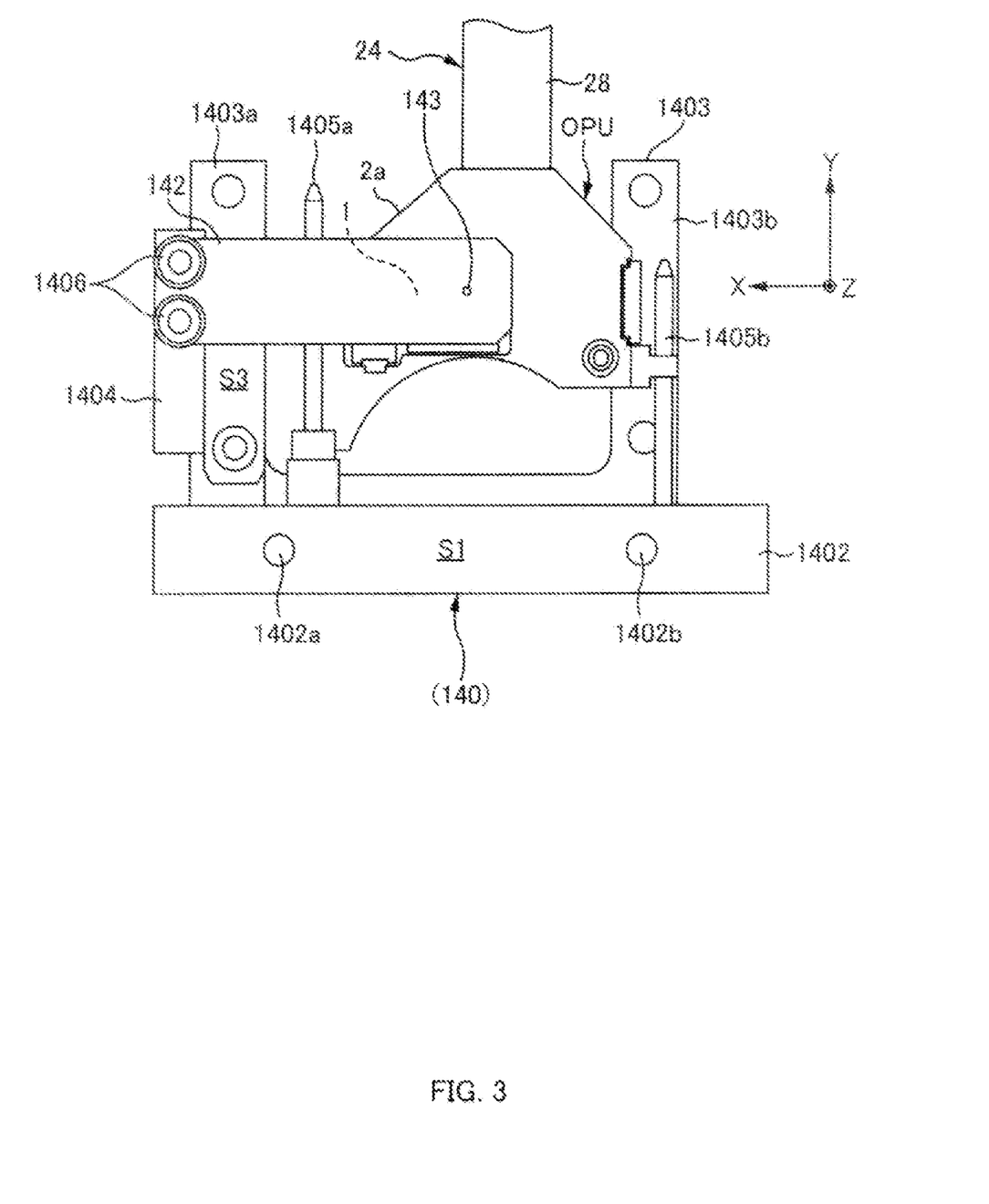
FIG. 3 is a top view of a second inspection jig with an optical sensor removed according to an embodiment of the present invention.

FIG. 2 is a perspective view of the second inspection jig 140. FIG. 3 is a plan view of the second inspection jig 140 when the optical sensor is removed from the second inspection jig 140 and the optical pickup apparatus OPU is attached. The X-Y-Z coordinates shown in FIGS. 2 and 3 are correlated.

A square-U-shaped bottom plate 1403 formed such that extending portions 1403a and 1403b in the positive direction of the Y-axis shown in FIGS. 2 and 3 are extended is installed on a horizontal surface H (FIG. 2), for example. A back plate 1402 in a flat plate shape is disposed perpendicular to the bottom side portion of the square U-shape of the bottom plate 1403 (in the positive direction of the Z-axis shown in FIGS. 2 and 3.) An upper surface S1 of the back plate 1402 is located on the opposite side to a lower surface that is on the side of the horizontal surface H (in the positive direction of the Z-axis shown in FIGS. 2 and 3) and is positioned at a height h1 in the direction of a height from the horizontal surface H.

A side plate 1404 in a flat plate shape is fit into a space with a substantially right angle between the back plate 1402 and the bottom plate 1403. The side plate 1404 is disposed perpendicular to the back plate 1402 and the bottom plate 1403. One square surface of the side plate 1404 is fit with a bone plate 1408 having, for example, two ribs extended perpendicular to the back plate 1402 (in the positive direction of the Y-axis shown in FIGS. 2 and 3), and the side plate 1404 is attached to the back plate 1402 and/or the bottom plate 1403 with four bolts 1407, etc., threaded to be attached into the bone plate 1408 from the other square surface of the side plate 1404.

An upper surface S3 of the side plate 1404 is located on the opposite side to a lower surface that is on the side of the horizontal surface H (in the positive direction of the Z-axis shown in FIGS. 2 and 3) and is coupled to one end portion on a lateral side of the aperture 142 with bolts 1406 in a manner perpendicular to the side plate 1404 (in the negative direction of the X-axis shown in FIGS. 2 and 3). As a result, the aperture 142 is disposed parallel to the horizontal surface H. The upper surface S3 of the side plate 1404 is positioned at a height h3 lower than the height h1 in the direction of the height from the horizontal surface H.

The upper surface S1 of the back plate 1402 is provided with bolt holes 1402*a* and 1402*b* and is coupled to an end portion of the optical sensor 144 through bolts in a manner perpendicular to the back plate 1402 (in the positive direction of the Y-axis shown in FIGS. 2 and 3). As a result, the aperture 142 and the optical sensor 144 are disposed parallel to the horizontal surface H. The position adjustment is made such that the pinhole 143 of the aperture 142 is opposed to a light receiving portion of the optical sensor 144.

Two metal support rods 1405*a* and 1405*b* are perpendicularly extended (in the positive direction of the Y-axis shown in FIGS. 2 and 3) from a side surface S2 perpendicular to the upper surface S1 of the back plate 1402. The two support rods 1405*a* and 1405*b* are extended from a position at a height h2 lower than the height h3 in the direction of the height from the horizontal surface H.

As shown in FIG. 10, the case 2 for housing the objective lens driving device 1, for example, the housing 2*a*, includes insert hole portions 70*a* and an opening portion 70*b* for allowing the support rods 1405*a* and 1405*b* to be inserted in a slidable state to support the optical pickup apparatus OPU in a horizontal state (parallel to the X-Y plane shown in FIGS. 2 and 3.)

For example, when the optical pickup apparatus OPU is movably mounted on the second inspection jig 140 with the support rods 1405*a* and 1405*b* thereof such that the support rod 1405*a* is inserted into the insert hole portions 70*a* of the optical pickup apparatus OPU and the support rod 1405*b* is inserted into the opening portion 70*b* of the optical pickup apparatus OPU, the optical pickup apparatus OPU is mounted parallel to the horizontal surface H on the second inspection jig 140. The aperture 142, the optical sensor 144, and the optical pickup apparatus OPU are disposed parallel to the horizontal surface H. The aperture 142 is positioned at substantially the height h3, the optical sensor 144 is positioned at substantially the height h1, and the optical pickup apparatus OPU is positioned at substantially the height h2, on the basis of the horizontal surface H. Because of the relationship of "h2<h3<h1", an arrangement is made in the order of the optical pickup apparatus OPU, the aperture 142, and the optical sensor 144 in the positive direction of the Z-axis shown in FIGS. 2 and 3.

==Position Adjustment of Aperture==

Figure 4:
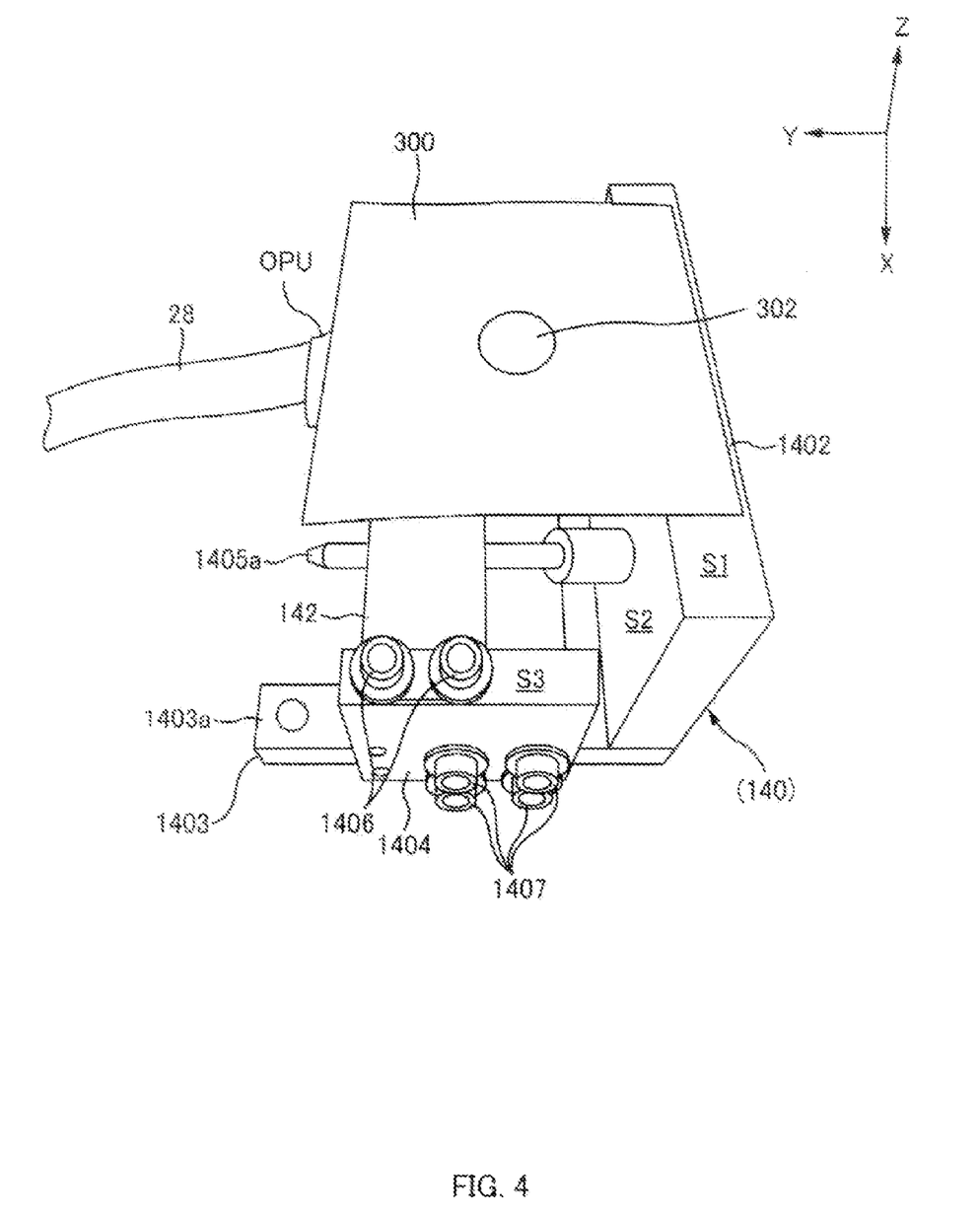
FIG. 4 is a diagram for explaining aperture position adjustment according to an embodiment of the present invention.
Figure 5:
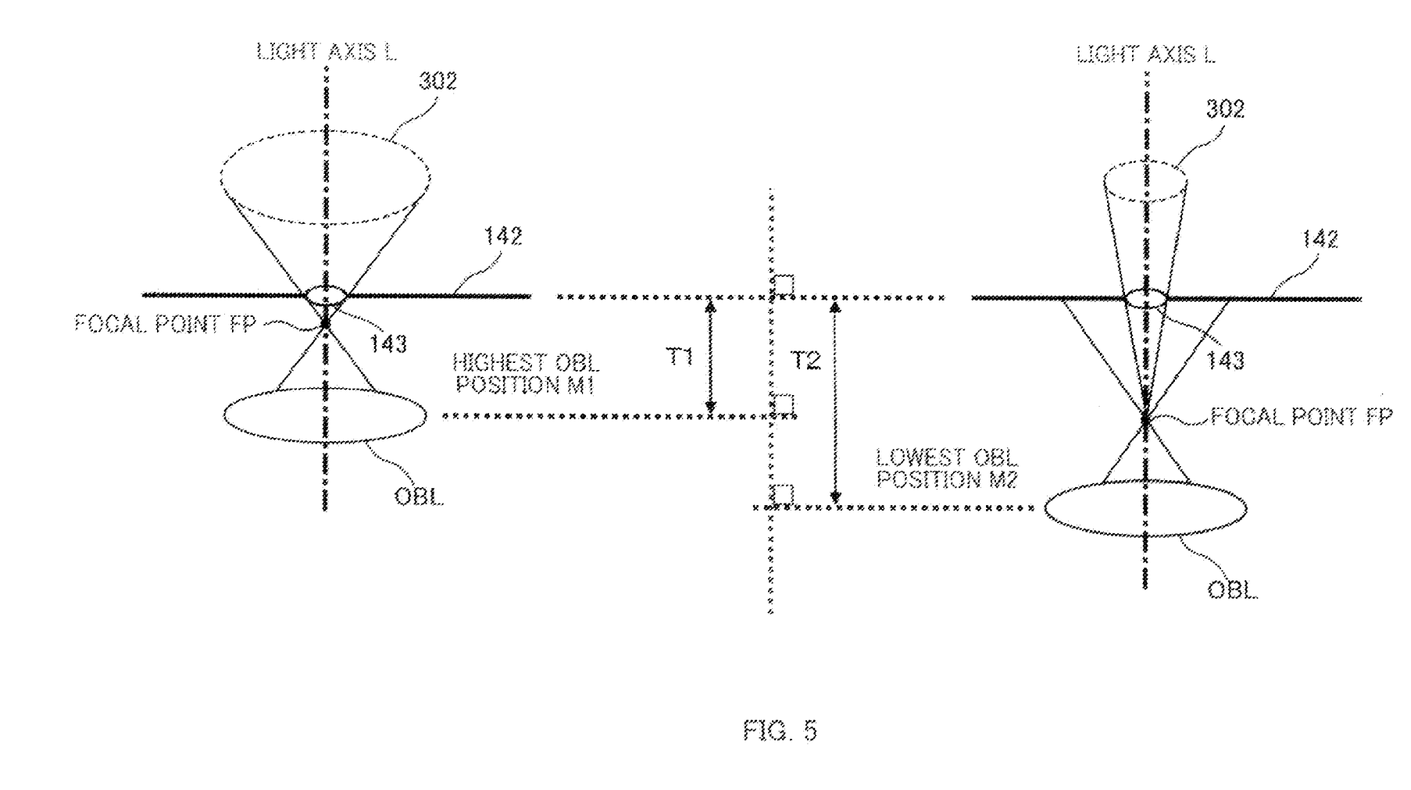
FIG. 5 is a diagram for explaining aperture position adjustment according to an embodiment of the present invention.

The position adjustment of the aperture 142 will be described with reference to FIGS. 3 to 7. The X-Y-Z coordinate shown in FIG. 4 is correlated with the X-Y-Z coordinates shown in FIGS. 2 and 3.

The position adjustment of the aperture 142 is initial adjustment performed for checking whether a light amount of a portion (projection image 302) of the condensed light flux having passed through the pinhole 143 from the objective lens OBL is changed according to a movement distance of the objective lens OBL in the focus direction.

First, the optical sensor 144 is removed from the second inspection jig 140 as in the state of the second inspection jig 140 shown in FIG. 3 to adjust a position of the aperture 142 such that the center of the pinhole 143 coincides with a light axis L of the objective lens OBL by a visual check.

A translucent screen 300 for displaying the projection image 302 is mounted, for example, in such a way as to fix a paper sheet with a tape at a position where the optical sensor 144 is removed. The laser light source of the optical pickup apparatus OPU is lighted, for example, with about 1 mW, and the pinhole position is adjusted such that the projection image 302 displayed on the translucent screen 300 becomes substantially circular.

A shift volume (not shown) included in the first inspection jig 110 is adjusted to set the focus coil drive voltage FV to the positive upper limit value (e.g., +2 V in an embodiment of the present invention), and the main body portion 30 of the actuator ACT including the objective lens OBL is moved closer to the translucent screen 300 (in the positive direction of the Z-axis shown in FIG. 4.) The objective lens OBL is stopped at the highest OBL position M1 (first position, see FIG. 5) that is the closest position to the translucent screen 300. At this point, a distant T1 from the aperture 142 to the objective lens OBL at the highest OBL position M1 is adjusted by the position adjustment of the side plate 1404 such that the largest projection image 302 is achieved. If a circle shape of the projection image 302 is deformed, the position of the aperture 142 is readjusted.

By an adjustment of the shift volume (not shown) included in the first inspection jig 110, the focus coil drive voltage FV is reduced from the positive upper limit value (e.g., +2 V in an embodiment of the present invention) to the negative lower limit value (e.g., −2 V in an embodiment of the present invention) to move the main body portion 30 of the actuator ACT including the objective lens OBL gradually away from the translucent screen 300 (in the negative direction of the Z-axis shown in FIG. 4.) That is, the objective lens OBL is moved from the highest OBL position M1 toward the lowest OBL position M2 (second position, see FIG. 5) that is the farthest position from the translucent screen 300. The OBL lowest position M2 is such a position that a distance from the aperture 142 to the objective lens OBL is T2. At this point, it is visually checked that the projection image 302 is reduced in size according to the movement distance of the objective lens OBL. If the projection image 302 is increased in size on the way, the distant T1 from the aperture 142 to the objective lens OBL is readjusted by adjusting the position of the side plate 1404.

If the aperture 142 is not provided on the second inspection jig 140, the entire condensed light flux from the objective lens OBL is made incident on the optical sensor 144, and thus, the light-reception current PDOUT of the optical sensor 144 is not changed. However, if the aperture 142 is provided, the illumination (light amount per unit area) on the optical sensor 144 is changed according to a distance from the focal point FP. Specifically, the illumination (light flux per unit area) is changed according to the distance from the focal point FP. The light-reception current PDOUT may be changed according to the distance from the focal point FP by providing the aperture 142 to extract light flux from the pinhole 143 having a given area.

Figure 6:
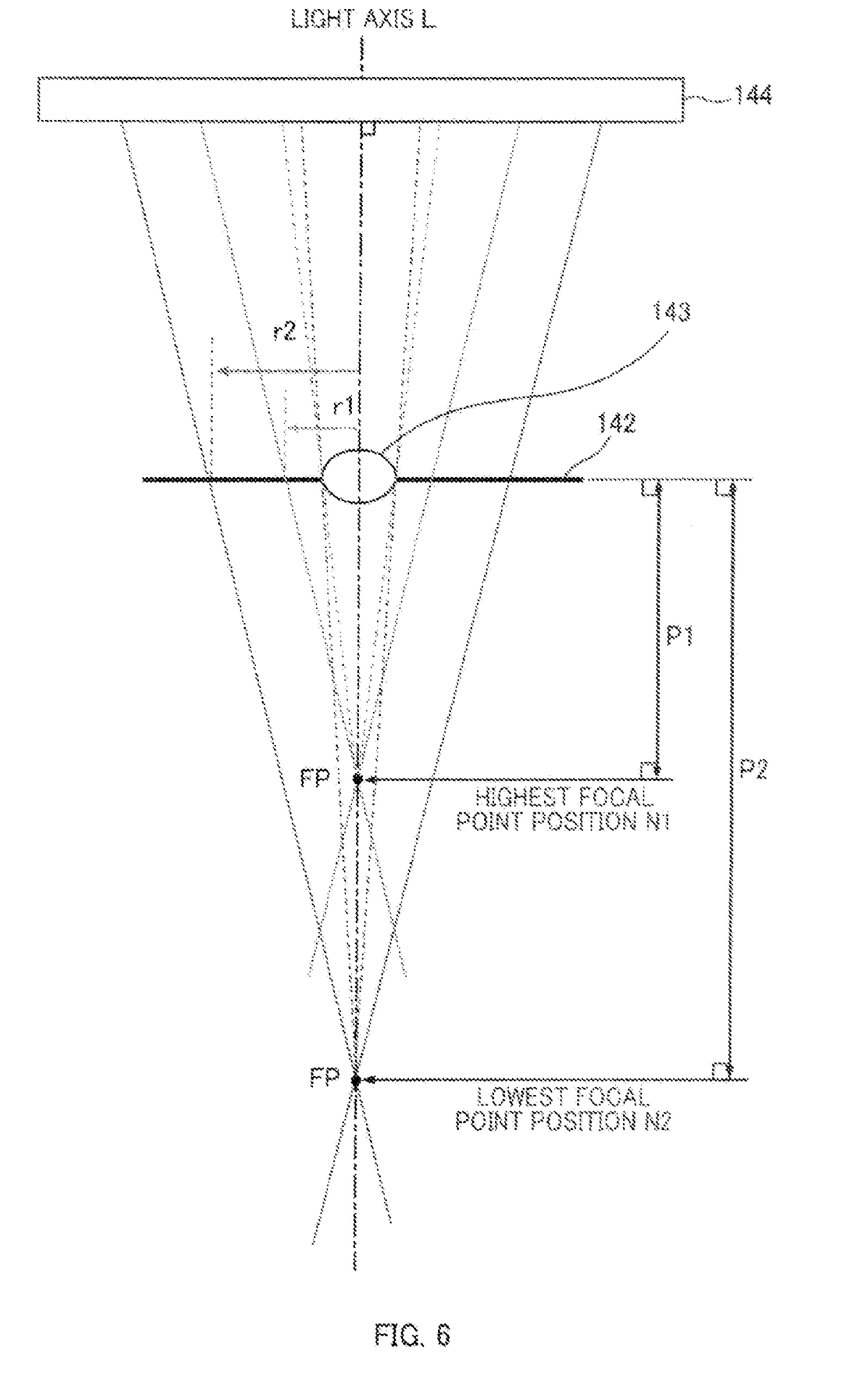
FIG. 6 is a diagram for explaining aperture position adjustment according to an embodiment of the present invention.

For example, assuming that r1 denotes a radius of an image formed by irradiation on the aperture 142 in the case of the highest focal point position N1; r2 denotes the radius of an image formed by irradiation on the aperture 142 in the case of the lowest focal point position N2; P denotes luminance (emitted light amount) as shown in FIG. 6, the illumination L1 on the aperture 142 in the case of the highest focal point position N1 is expressed by an equation (1) and the illumination L2 on the aperture 142 in the case of the lowest focal point position N2 is expressed by an equation (2). A ratio of the illumination L2 to the illumination L1 (=L2/L1) is expressed by an equation (3) using the equations (1) and (2).

$$L1 = P/\pi \cdot r1 \quad (1)$$

$$L2 = P/\pi \cdot r2 \quad (2)$$

$$L2/L1 = r1/r2 \quad (3)$$

A ratio of the radius r2 to the radius r1 (=r2/r1) corresponds to a ratio of a distance P2 between the lowest focal point position N2 and the aperture 142 to a distance P1 between the highest focal point position N1 and the aperture 142 (=P2/P1). Therefore, the equation (3) may be modified into an equation (4).

$$L2/L1 = P2/P2 \quad (4)$$

When the aperture 142 is used to extract a portion of the condensed light flux to be applied to the optical sensor 144, the optical sensor 144 outputs the light-reception current PDOUT in proportion to the illumination on the aperture 142. Therefore, it is known from the equation (4) that the light-reception current PDOUT is changed in inverse proportion to the square of the rate of P1/P2 as to the distance between the aperture 142 and the focal point FP. For example, when the distance P1 between the aperture 142 and the focal point FP is shorter, the light-reception current PDOUT is increased, and when the distance P2 between the aperture 142 and the focal point FP is longer, the light-reception current PDOUT is reduced.

However, a relation with the diameter of the pinhole 143 also should be noted. The pinhole 143 needs to have a diameter that is set smaller than the area of the image formed by irradiation at the aperture 142 within the movement range of the main body portion 30 of the actuator ACT and should allow the condensed light flux to pass therethrough as much as possible. If the diameter of the pinhole 143 is too small, the light-reception current PDOUT might be so reduced that detection thereof is difficult. On the other hand, when the focal point FP of the laser beam is at the highest focal point position M1, if the diameter of the pinhole 143 is too large relative to the diameter of the expanded light to pass through the pinhole 143 of the aperture 142, the projection image 302 displayed on the translucent screen 300 may not be changed in size, even if the focal point FP of the laser beam is moved between the highest focal point position N1 and the lowest focal point position N2. Therefore, it becomes difficult to check changes in the light-reception current PDOUT due to changes in the position of the objective lens OBL. Therefore, the diameter of the pinhole 143 is determined based on parameters such as the focus-direction movement range of the main body portion 30 of the actuator ACT, the attachment position of the aperture 142, the numerical aperture (NA) of the objective lens OBL, and the lens diameter.

After the position adjustment of the aperture 142, the translucent screen 300 is removed and the optical sensor 144 is reattached to the second inspection jig 140. An oscillation volume and the shift volume (both not shown) included in the first inspection jig 110 are adjusted to generate the sine-wave focus coil drive voltage FV. For example, the amplitude of the sine wave is set according to the oscillation volume; the peak-to-peak value of the since wave is set by the shift volume, etc.; and the upper limit value and the lower limit value of the sine wave are set by the shift volume.

Figure 7:
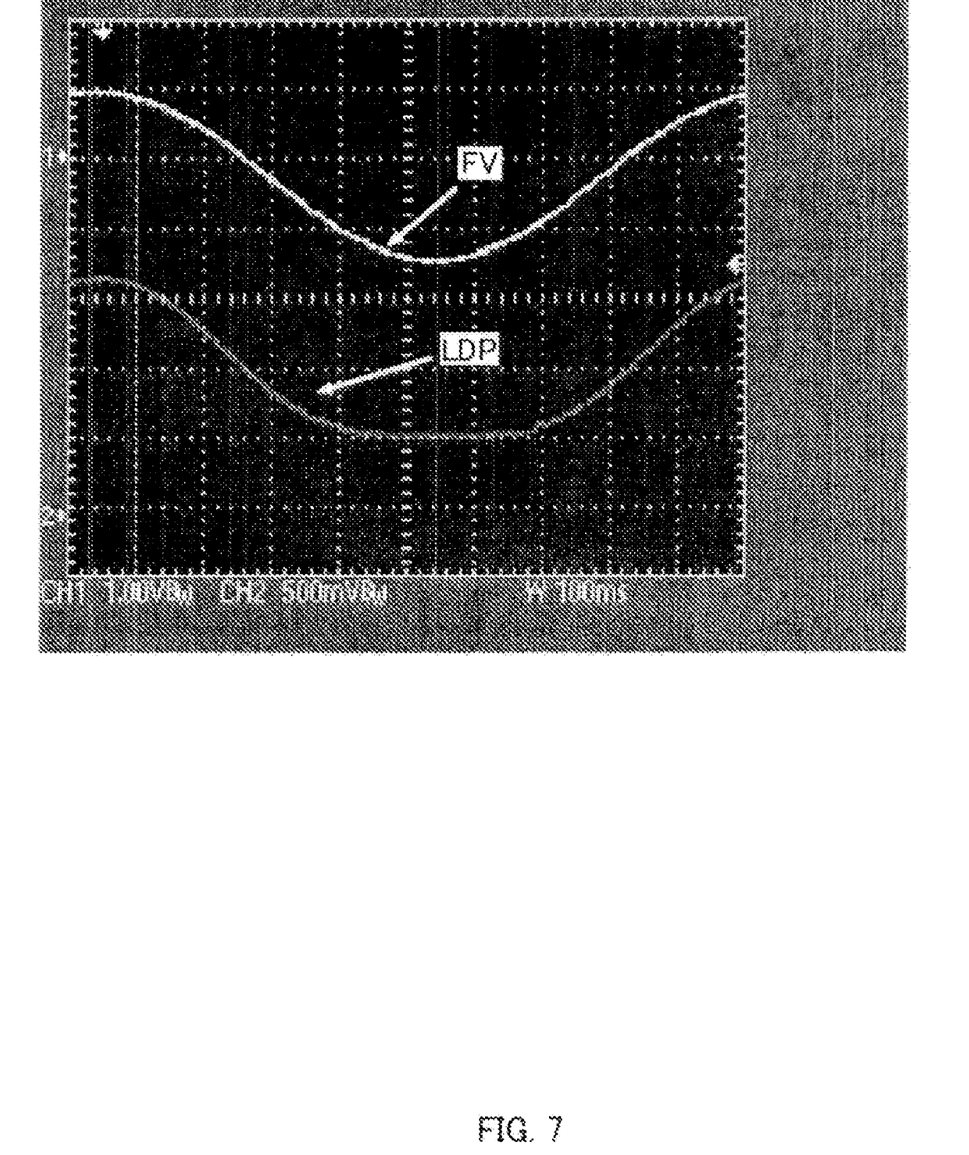
FIG. 7 is a diagram for explaining aperture position adjustment according to an embodiment of the present invention.

At this point, it is visually checked that the waveform of the sensor output voltage LDP output from the I/V amplifier 150 is a waveform following (having the same phase and the same amplitude as) the sine wave of the focus coil drive voltage FV as time changes, as shown in FIG. 7, on the display screen 161 of the oscilloscope 160. If the waveform of the sensor output voltage LDP is not the waveform following the sine wave of the focus coil drive voltage FV as time changes, the position adjustment of the aperture 142 is performed again.

==Inspecting Method==

An inspecting method of the operation status at the time of performing the focusing control of the objective lens driving device 1 will be described with reference to FIGS. 8 and 9.

After the position adjustment of the aperture 142, the oscillation volume and the shift volume (both not shown) included in the first inspection jig 110 are adjusted so that the waveform of the focus coil drive voltage FV becomes a sine wave (e.g., a waveform in a range from the upper limit value of +1 V to the lower limit value of −2.2 V according to an embodiment of the present invention.) The displayed waveforms is then visually checked representing the correlation between the focus coil drive voltage FV and the sensor output voltage LDP on the display screen 161 of the oscilloscope 160.

Figure 8A:
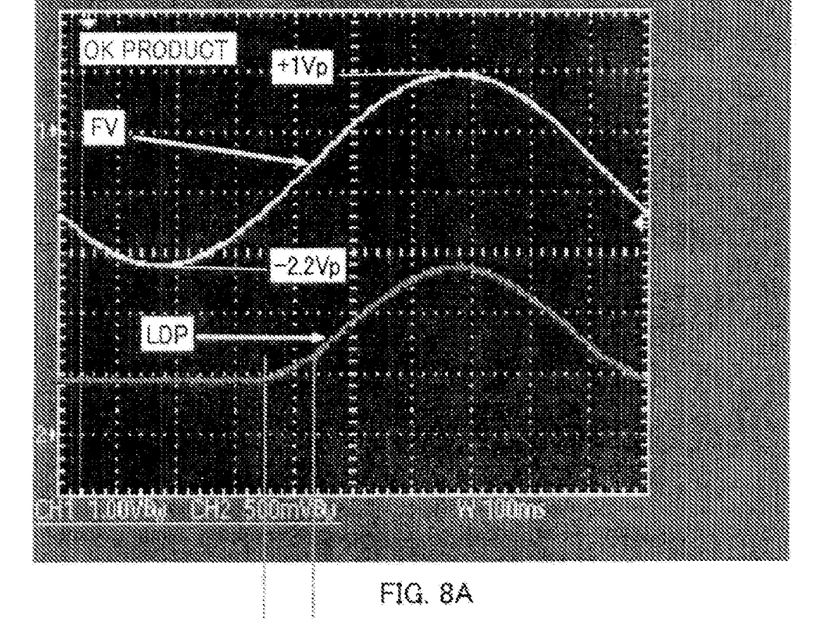
FIG. 8A is a diagram of a display screen of a waveform displaying device in a normal case as a result of executing an inspecting method for an objective lens driving device according to an embodiment of the present invention.
Figure 8B:
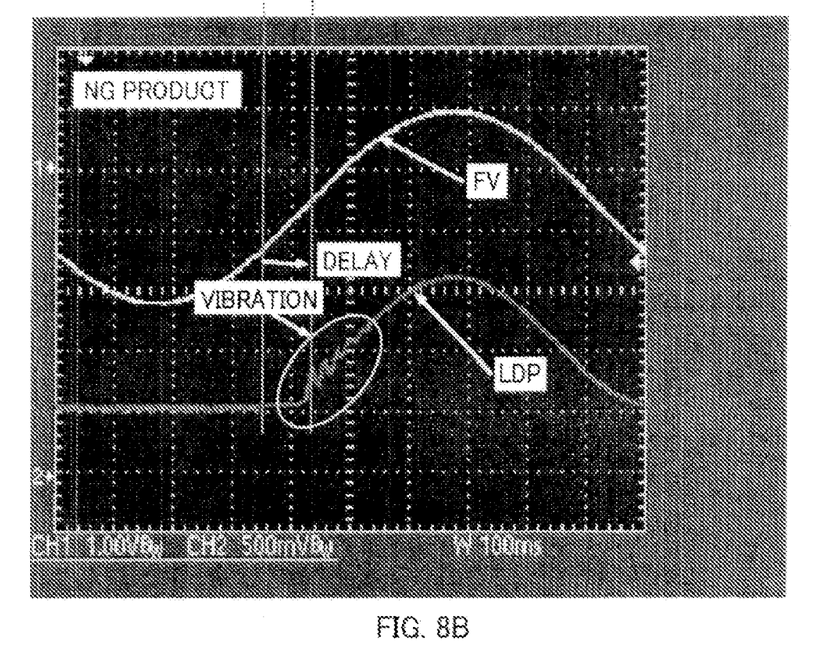
FIG. 8B is a diagram of a display screen of a waveform displaying device in an abnormal case as a result of executing an inspecting method for an objective lens driving device according to an embodiment of the present invention.

FIGS. 8A and 8B depict screen display examples with the oscilloscope 160 when the waveform of the focus coil drive voltage FV and the waveform of the sensor output voltage LDP are displayed side by side on the same time axis. The vertical axis (Y-axis) represents voltage and the horizontal axis (X-axis) represents time. FIG. 8A depicts a waveform example when the movement of the main body portion 30 of the actuator ACT in the focus direction is normal (in the case of OK (okay) products) and FIG. 8B depicts a waveform example when the movement of the main body portion 30 of the actuator ACT in the focus direction is abnormal (in the case of NG (no good) products).

When comparing FIGS. 8A and 8B, it may be seen that in the abnormal case, the rising of the sensor output voltage LDP is delayed relative to that of the focus coil drive voltage FV and, for example, vibrations are generated when the sensor output voltage LDP rises. From the above, it may be found that the cause is that in the case of FIG. 8B, an adhesive foreign substance adheres to the one-step lowered surface 10a substantially in the center of the base 10 opposed to the rear surface 30a of the main body portion 30 of the actuator ACT so that the main body portion 30 of the actuator ACT is not smoothly moved (the controlled response is not in a linear form) due to the adhesive foreign substance when attempting to move the rear surface 30a of the main body portion 30 of the actuator ACT away from the one-step lowered surface 10a substantially in the center of the base 10.

Figure 9A:
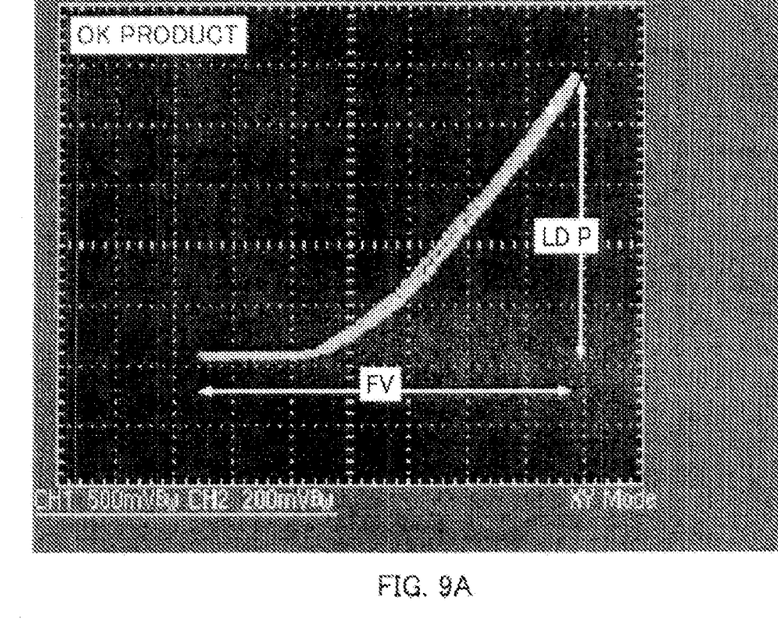
FIG. 9A is a diagram of a display screen of a waveform displaying device in a normal case as a result of executing an inspecting method for an objective lens driving device according to an embodiment of the present invention.
Figure 9B:
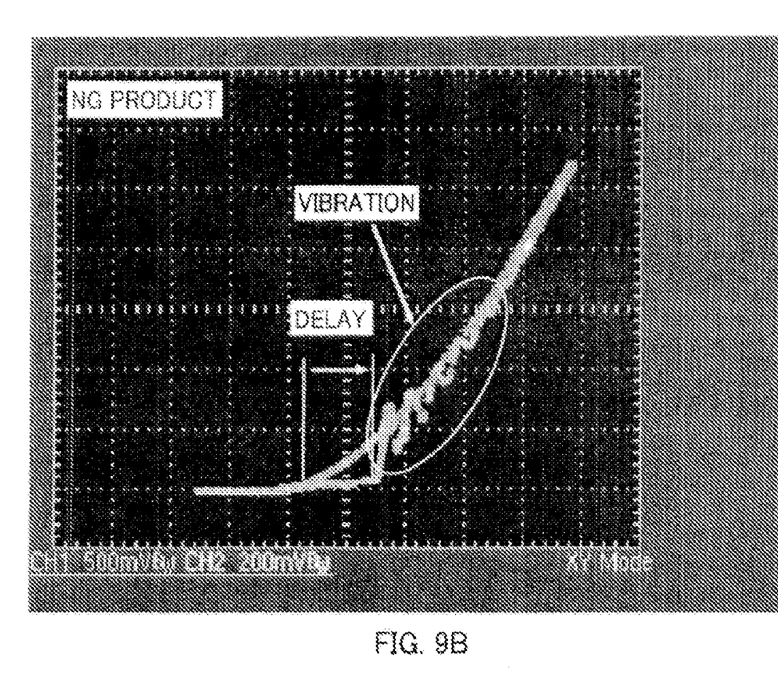
FIG. 9B is a diagram of a display screen of a waveform displaying device in an abnormal case as a result of executing an inspecting method for an objective lens driving device according to an embodiment of the present invention.

FIGS. 9A and 9B depict screen display examples with the oscilloscope 160 when the waveform of the focus coil drive voltage FV and the waveform of the sensor output voltage LDP are displayed as Lissajous waveforms. The vertical axis (Y-axis) represents the sensor output voltage LDP and the horizontal axis (X-axis) represents the focus coil drive voltage FV. FIG. 9A is a magnified view when the movement of the main body portion 30 of the actuator ACT in the focus direction is normal and FIG. 9B is a magnified view when the movement of the main body portion 30 of the actuator ACT in the focus direction is not normal. In the case of the Lissajous waveforms, as compared to the time change waveforms shown in FIGS. 8A and 8B, it is advantageous that the waveform of the focus coil drive voltage FV and the waveform of the sensor output voltage LDP may be represented as one waveform and that the focus coil drive voltage FV and the sensor output voltage LDP are easily be compared.

It may be seen that in the normal case shown in FIG. 9A, the change in the focus coil drive voltage FV when increasing the focus coil drive voltage FV from the lower limit value to the upper limit value is substantially identical to the change in the sensor output voltage LDP when increasing the sensor output voltage LDP from the lower limit value to the upper Limit value. On the other hand, it may be seen that in the normal case shown in FIG. 9A, the change in the focus coil drive voltage FV when increasing the focus coil drive voltage FV from the lower limit value to the upper limit value is not identical to the change when increasing the sensor output voltage LDP from the lower limit value to the upper limit value.

If the situation illustrated in FIG. 9B occurs, it may be seen that the rising of the sensor output voltage LDP is delayed and, for example, vibrations are generated after the sensor output voltage LDP starts rising, when the focus coil drive voltage FV is increased from the lower limit value to the upper limit value. From the above, it may be found that in the case of FIG. 9B, the cause is that the main body portion 30 of the actuator ACT is not smoothly moved (the controlled response is not in a linear form) due to the adhesive foreign substance.

The movement of the objective lens OBL in the focus direction with the objective lens driving device 1 is inspected by performing the inspecting method for the objective lens driving device 1 with the use of the inspecting apparatus W for the objective lens driving device 1 as above.

The above embodiments of the present invention are simply for facilitating the understanding of the present invention and are not in any way to be construed as limiting the present invention. The present invention may variously be changed or altered without departing from its spirit and encompass equivalents thereof.

For example, although the oscilloscope 160 is exemplary illustrated as a signal inspecting apparatus for inspecting the objective lens driving device 1 based on the signal obtained by the photoelectric conversion by the optical sensor 144, etc., an apparatus other than the oscilloscope 160 may be used as the signal inspecting apparatus.

For example, when the focus coil drive voltage FV is changed, the voltage may be increased to a predetermined value between the lower limit value and the upper limit value but not be increased to the upper limit value. Even in the case as above, since the main body portion 30 of the actuator ACT may be lowered to the lowest OBL position M2, it is possible to check whether the adhesive foreign substance enters between the rear surface 30a of the main body portion 30 of the actuator ACT and the one-step lowered surface 10a substantially in the center of the base 10, through the display of the focus coil drive voltage FV and the sensor output voltage LDP displayed on the display screen 161.

In such a case that a foreign substance such as dust enters between the rear surface 30a of the main body portion 30 of the actuator ACT and the one-step lowered surface 10a substantially in the center of the base 10, this may be detected through the display of the focus coil drive voltage FV and the sensor output voltage LDP on the displayed screen 161. Specifically, this may be detected from the display of the waveform of the sensor output voltage LDP which is not reduced to a predetermined lower limit value when the focus coil drive voltage FV is reduced from the upper limit value to the lower limit value.

What is claimed is:

1. An inspecting method for an object lens driving device including a base, an objective lens, a holder for holding the objective lens on the base, and a drive mechanism for driving the holder so as to move the objective lens in the focus direction, the method comprising the steps of:
   emitting a laser beam through the objective lens;
   allowing the laser beam emitted through the objective lens to pass through an aperture having a predetermined diameter;
   applying to the drive mechanism a drive voltage for moving the holder between a first position closest to a surface of the base and a second position farther than the first position from the surface of the base;
   performing photoelectric conversion of the laser beam having passed through the aperture; and
   inspecting the objective lens driving device based on a signal obtained by the photoelectric conversion,
      wherein the predetermined diameter of the aperture is set to a value that is smaller than an area of an image formed by irradiation of the laser beam in a range where the holder moves between the first position and the second position.

2. An inspecting method for an object lens driving device including a base, an objective lens, a holder for holding the objective lens on the base, and a drive mechanism that for driving the holder so as to move the objective lens in the focus direction, the method comprising the steps of:
   emitting a laser beam through the objective lens;
   allowing the laser beam emitted through the objective lens to pass through an aperture having a predetermined diameter;
   applying to the drive mechanism a drive voltage for moving the holder between a first position closest to a surface of the base and a second position farther than the first position from the surface of the base;
   performing photoelectric conversion of the laser beam having passed through the aperture; and
   displaying a waveform of the drive voltage and a waveform of a voltage obtained by the photoelectric conversion on a display screen,
      wherein the predetermined diameter of the aperture is set to a value that is smaller than an area of an image formed by irradiation of the laser beam in a range where the holder moves between the first position and the second position.

3. The inspecting method for the object lens driving device of claim 2, wherein:
   the waveform of the drive voltage and the waveform of the voltage obtained by the photoelectric conversion are displayed side by side on the same time axis.

4. The inspecting method for the object lens driving device of claim 2, wherein:
   the waveform of the drive voltage and the waveform of the voltage obtained by the photoelectric conversion are displayed as Lissajous waveforms.

5. An inspecting apparatus for an object lens driving device, comprising:

a drive voltage generator configured to generate a drive voltage for a drive mechanism for driving a holder that holds an objective lens on a base so as to move the objective lens in the focus direction, the drive voltage being a voltage for moving the holder between a first position closest to a surface of the base and a second position farther than the first position from the surface of the base;

an aperture having a predetermined diameter for allowing a laser beam emitted through the objective lens to pass therethrough;

a sensor configured to perform photoelectric conversion of the laser beam having passed through the aperture; and a signal inspecting apparatus configured to inspect the objective lens driving device based on a signal obtained by the photoelectric conversion, wherein the predetermined diameter of the aperture is set to a value that is smaller than an area of an image formed by irradiation of the laser beam in a range where the holder moves between the first position and the second position.

6. An inspecting apparatus for an object lens driving device, comprising:

a drive voltage generator configured to generate a drive voltage for a drive mechanism for driving a holder that holds an objective lens on a base so as to move the objective lens in the focus direction, the drive voltage being a voltage for moving the holder between a first position closest to a surface of the base and a second position farther than the first position from the surface of the base;

an aperture having a predetermined diameter for allowing a laser beam emitted through the objective lens to pass therethrough;

a sensor configured to perform photoelectric conversion of the laser beam having passed through the aperture; and a waveform displaying device configured to display on a display screen a waveform of the drive voltage and a waveform of a voltage objected by the photoelectric conversion with the sensor, wherein the predetermined diameter of the aperture is set to a value that is smaller than an area of an image formed by irradiation of the laser beam in a range where the holder moves between the first position and the second position.

7. An inspecting method for an object lens driving device including a base, an objective lens, a holder for holding the objective lens on the base, and a drive mechanism that for driving the holder so as to move the objective lens in the focus direction, the method comprising the steps of:

emitting a laser beam through the objective lens;

allowing the laser beam emitted through the objective lens to pass through an aperture having a predetermined diameter;

applying to the drive mechanism a drive voltage for moving the holder between a first position closest to a surface of the base and a second position farther than the first position from the surface of the base;

performing photoelectric conversion of the laser beam having passed through the aperture; and displaying a waveform of the drive voltage and a waveform of a voltage obtained by the photoelectric conversion on a display screen, wherein the waveform of the drive voltage and the waveform of the voltage obtained by the photoelectric conversion are displayed as Lissajous waveforms.

8. An inspecting apparatus for an object lens driving device, comprising:

a drive voltage generator configured to generate a drive voltage for a drive mechanism for driving a holder that holds an objective lens on a base so as to move the objective lens in the focus direction, the drive voltage being a voltage for moving the holder between a first position closest to a surface of the base and a second position farther than the first position from the surface of the base;

an aperture having a predetermined diameter for allowing a laser beam emitted through the objective lens to pass therethrough;

a sensor configured to perform photoelectric conversion of the laser beam having passed through the aperture; and a waveform displaying device configured to display on a display screen a waveform of the drive voltage and a waveform of a voltage objected by the photoelectric conversion with the sensor, wherein the waveform of the drive voltage and the waveform of the voltage obtained by the photoelectric conversion are displayed as Lissajous waveforms.

* * * * *